United States Patent
Calais et al.

(10) Patent No.: US 6,736,166 B2
(45) Date of Patent: May 18, 2004

(54) CASING SPACER

(75) Inventors: Chad Anthony Calais, Breaux Bridge, LA (US); Gary Dwayne Simon, Breaux Bridge, LA (US)

(73) Assignee: Advance Products and Systems, Inc., Scott, LA (US)

( * ) Notice: Subject to any disclaimer, the term of this patent is extended or adjusted under 35 U.S.C. 154(b) by 0 days.

(21) Appl. No.: 10/133,533

(22) Filed: Apr. 26, 2002

(65) Prior Publication Data

US 2003/0201025 A1 Oct. 30, 2003

(51) Int. Cl.⁷ .................................................. F16L 9/18
(52) U.S. Cl. .................... 138/112; 138/159; 138/169
(58) Field of Search ............................ 138/106, 112, 138/159, 160, 169

(56) References Cited

U.S. PATENT DOCUMENTS

| | | | | |
|---|---|---|---|---|
| 4,896,701 A | * | 1/1990 | Young | 138/108 |
| 5,441,082 A | | 8/1995 | Eskew et al. | |
| 5,592,975 A | * | 1/1997 | Wissmann et al. | 138/112 |
| 5,934,334 A | * | 8/1999 | Gray, Jr. et al. | 138/112 |
| 6,158,475 A | * | 12/2000 | Clemmer | 138/112 |
| 6,571,832 B1 | * | 6/2003 | Elliott | 138/108 |

OTHER PUBLICATIONS

Corrosion Control Products, Ranger II Casing Spacers by PSI, pp. 1–8, effective date found Aug. 2003.*
Advanced Products and Systems, Inc., 4 pages, Lafayette, Louisiana, 2001.
Ford Meter Box Company, Inc., 2 pages, Uni–Flange Casing Spacers, Wabash, Indiana, 2001.

* cited by examiner

*Primary Examiner*—James Hook
(74) *Attorney, Agent, or Firm*—William W. Stagg

(57) ABSTRACT

A casing spacer comprised of a pair of bands formed in a semi-circular configuration of a desired radius. Each band has a plurality of threaded studs that extend radially outward from the outside radial surface of each of the bands. The bands have a plurality of selected interchangeable risers, each of the interchangeable risers is configured to extend a desired distance from the outside radial surface of each of the band. The risers have a plurality of bore holes that are adapted to receive one of the threaded studs. The risers are detachably mounted to the bands by way of the threaded studs. The bands are fastened together around a carrier pipe to support the carrier pipe on the selected risers at a desired position when the carrier pipe is inserted into a casing pipe.

16 Claims, 5 Drawing Sheets

CASING SPACER

FIELD OF THE INVENTION

This invention relates to spacers for positioning carrier pipe within an outer casing pipe, and more particularly to improved casing spacers having a plurality of interchangeable risers for holding the carrier pipe at a desired position within the outer casing pipe.

BACKGROUND OF THE INVENTION

In piping systems, an outer casing pipe is often utilized as a raceway or conduit through which is inserted a plurality of carrier pipes. The casing pipe serves to insulate and protect the carrier pipes from external environmental forces and thus prolongs the serviceability of the carrier pipes. Casing spacers are used to keep the carrier pipes in a desired position or alignment within the casing pipe, or in the case of gravity flow lines, maintain the carrier pipe at a desired grade or position along the length of the casing pipe.

Conventional casing spacers typically are comprised of a band that is secured, by bolting or other means, around the carrier pipe. Attached to the band is a plurality of risers or supports that extend outward from the surface of the band and, when the casing spacer is mounted to a carrier pipe, the carrier pipe itself. These casing spacers are placed at desired locations along the carrier pipe running within the casing pipe to support the carrier pipe within the casing.

Casing spacers are typically manufactured with bands of pre-determined sizes to fit around a desired sized carrier pipe. These bands typically have permanently fixed risers of a specified length to conform to the size of the casing pipe through which the carrier pipe is inserted. Suppliers and contractors must stock casing spacers having a variety of bands in different sizes, each having risers of a certain height, in order to accommodate the variety of carrier pipe diameters and casing pipe diameters that might be utilized on a job site. This increases the cost of maintaining a casing spacer inventory and thus the cost of construction and installation of the piping systems.

SUMMARY OF THE INVENTION

Applicants' invention provides a casing spacer and method of use that reduces the number of different sizes of casing spacers that must be maintained to accommodate different sized carrier pipes and casing. The invention is comprised of a plurality of casing spacers each casing spacer being comprised of a band or belt that is secured around a carrier pipe by bolting, clamping, straps or other securing means. Each band or belt has a plurality of risers extending radially outward from the bands. The risers rest on the internal wall of the casing pipe, provide support for the carrier pipe and maintain the carrier pipe at a desired spacing from the wall of the casing pipe. The risers of Applicants' invention are readily attachable and detachable from the bands. This allows a user to select a riser of a desired length and configuration.

Applicants' invention will allow a user to maintain an inventory of bands to accommodate a selected range of pipe sizes and a range of risers in varying dimensions. Each of the risers of Applicants' invention may be mounted to any one of the bands in the user's inventory to form a casing spacer of a desired configuration. The user will be able to reduce the number of different casing spacers that must be maintained in the user's inventory of casing spacers, and consequently the cost of maintaining an inventory of casing spacers. Use of the casing spacers of Applicants' invention will also allow for rapid field adjustments to be made and thus reduce the time and costs of field changes during pipeline construction.

Because the bands used to form the casing spacers of Applicants' invention are adapted to receive risers of a desired length to form a casing spacer of a specified dimension, the casing spacers of Applicants' invention are particularly suitable for use in adjusting the grade of a gravity flow carrier pipe such as a sewer pipe. The fall or rise of the carrier pipe may be adjusted simply by fitting each of the bands of Applicants' casing spacer with risers of a selected length. By using a plurality of casing spacers with risers of a desired graduated length, the pipeline can then be adjusted to a desired grade by selectively arranging the casing spacers along the length of the pipeline to position and support the carrier pipe at a desired slope or grade.

The risers of Applicants' casing spacer can also be adapted to be readily attachable to the risers or bands of a second casing spacer that is supporting another carrier pipe. Use of such risers with the bands of Applicants' casing spacer will allow for multiple carrier pipes to be arranged and fixed in a desired position within a single casing pipe. Thus, combinations of carrier piping and other conduit may be conveniently located during construction.

It will be seen that other uses and features of the present invention will be apparent from the following detailed description of Applicants' invention.

DESCRIPTION OF THE PREFERRED EMBODIMENTS

Figure 1:
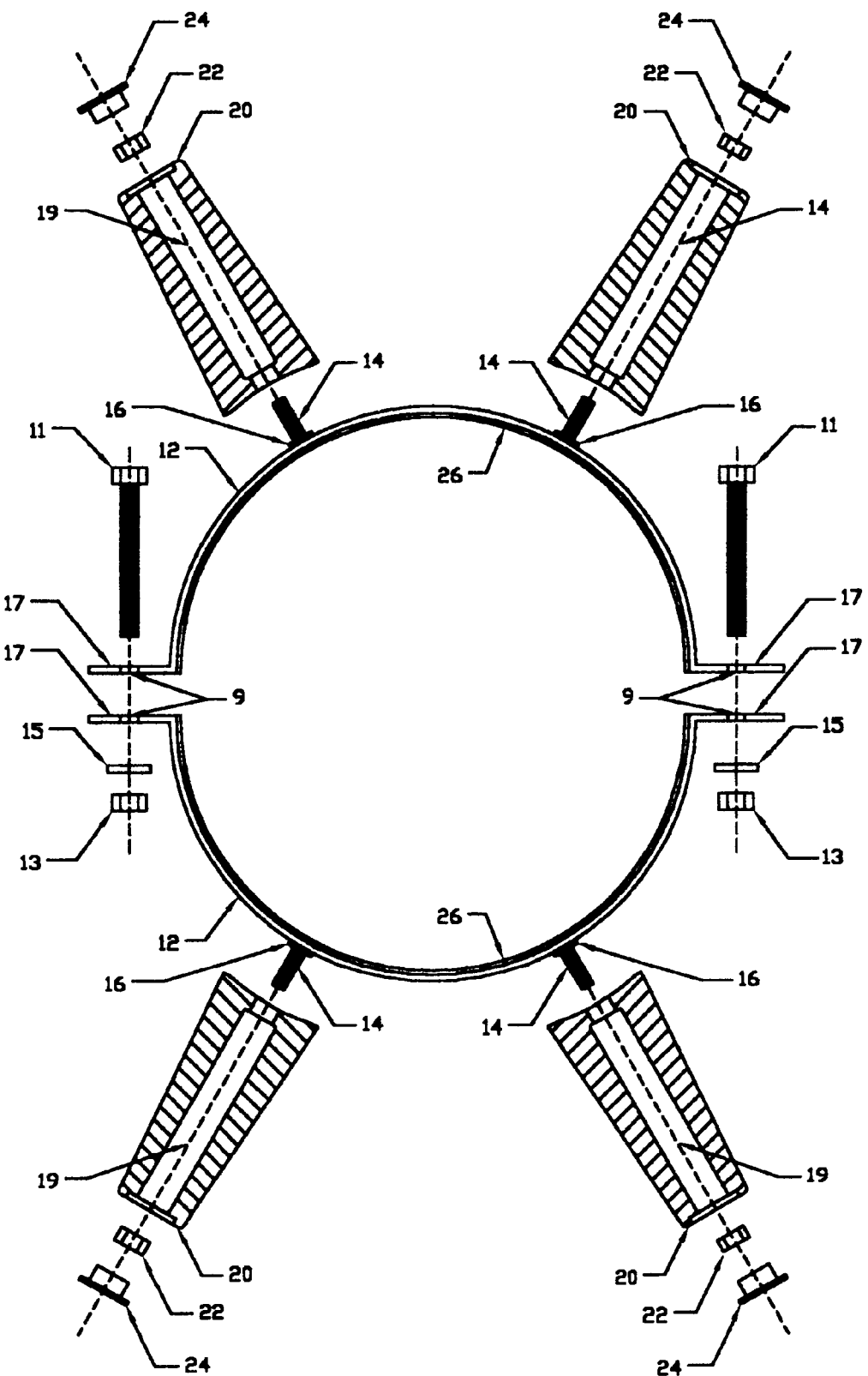
FIG. 1 is an exploded cross-section view of the casing spacer of Applicants' present design.

FIG. 1 shows an exploded cross-section view of the casing spacer (10) of Applicants' present design. The casing spacer (10) is comprised of pair of bands (12) formed from a desired length of sheet metal or other suitable material such as a plastic or polymer. Each band (12) is formed in a semi-circular configuration of a desired radius and has a pair of opposing outwardly extending flanges (17). Each of the flanges (17) has a plurality of holes (9) for receiving a bolt (11) for joining and holding the two bands (12) together securely around a circular carrier pipe by means of washers (15) and nuts (13). It is intended that the bands (12) be formed in a variety of semi-circular sizes so that when selected bands (12) are joined together, they will form a circular band around the circumference of a carrier pipe of a desired size. Bands (12) of various selected sizes are provided to accommodate a range of variously sized carrier pipes. A resilient elastomeric liner or pad (26) is mounted to the inside radial surface of each band (12) to aid in securing the band (12) to a carrier pipe.

Each band (12) has a plurality of radially extending threaded studs (14) attached to the bands (12) by means of welds (16) or by other fastening means. These studs (14) are used to secure a plurality of risers (20) to each band (12). Each riser (20) has a opening or bore (19) for receiving the studs (14). Each riser (20) is fastened to the band (12) by means of a nut (22). A cap plate (24) is provided to cover the bore (19) and protect the stud (14) and riser (20) from dirt, water or other corrosive materials.

Each riser (20) is formed from synthetic materials, or a combination of such materials, such as virgin resins, polyolefins and plastics, as well as other elastomers, including high density polyethylene (HDPE), polyethylene terephthalate (PET), styrene-butadiene rubber (SBR) and vulcanized rubber. However, the risers (20) can also be formed from cast metals or metal alloys without departing from the scope of Applicants' invention.

To mount a riser (20) of a desired length to the band (12), each stud (14) is inserted into the bore (19) formed in each riser (20). Each riser (20) is held in place on the band (12) by means of the nut (22) and the threaded stud (14). The riser (20) is removable from the band (12) by means of loosening and removing the threaded nut (22). The bore (19) is configured to receive the drive socket of a socket wrench or other fastener-tightening device to turn the nut (22). Selected risers (20) of a desired length are used to complete the casing spacer (10). If necessary or desirable, each riser (20) may be removed from the band (12) as desired and replaced with another riser (20) which can then be attached as described to create a casing spacer (10) of a different desired configuration.

Figure 2:
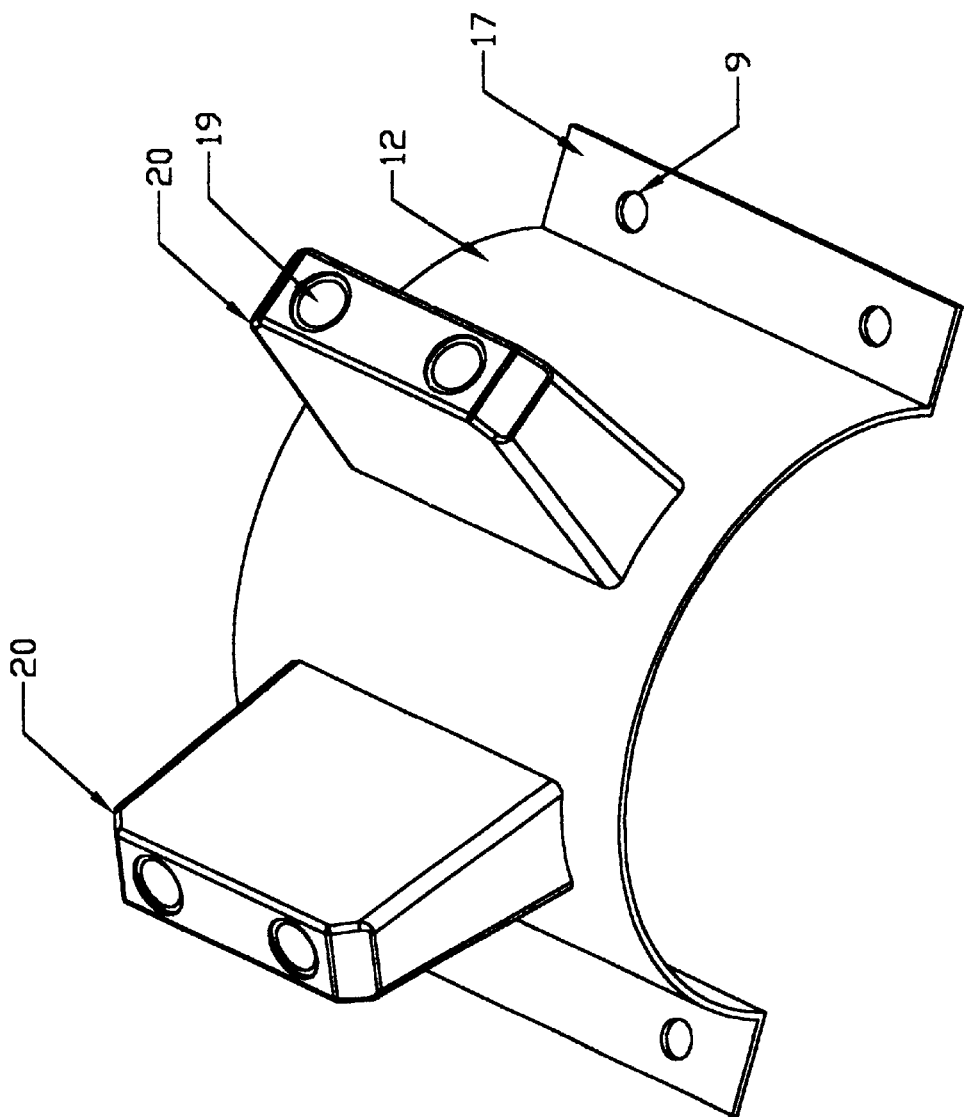
FIG. 2 is a perspective view of a band and riser combination of the casing spacer shown in FIG. 1.

FIG. 2 is a perspective view of a single band (12) of the casing spacer (10) having connecting flanges (17), attachment holes (9), and risers (20). The risers (20) are mounted to the band (12) by means of the threaded studs (14) that are inserted in the riser bore (19). The risers (20) extend radially outward from the outside radial surface of the band (12) and are provided in a plurality of sizes each having a selected or desired width, length and height. The ability of the user to select a desired height and configuration of the riser (20) for attachment to the band (12) allows the casing spacers (10) to be configured to accommodate varying sizes of casing pipe. This will allow for a reduction in the number of casing spacers that must be included in the inventory of suppliers and contractors to accommodate varying job situations. Bands (12) for selected pipe diameters can be fitted with any number of differently sized risers (20) to make a custom fitted casing spacer for the job at hand.

Figure 3:
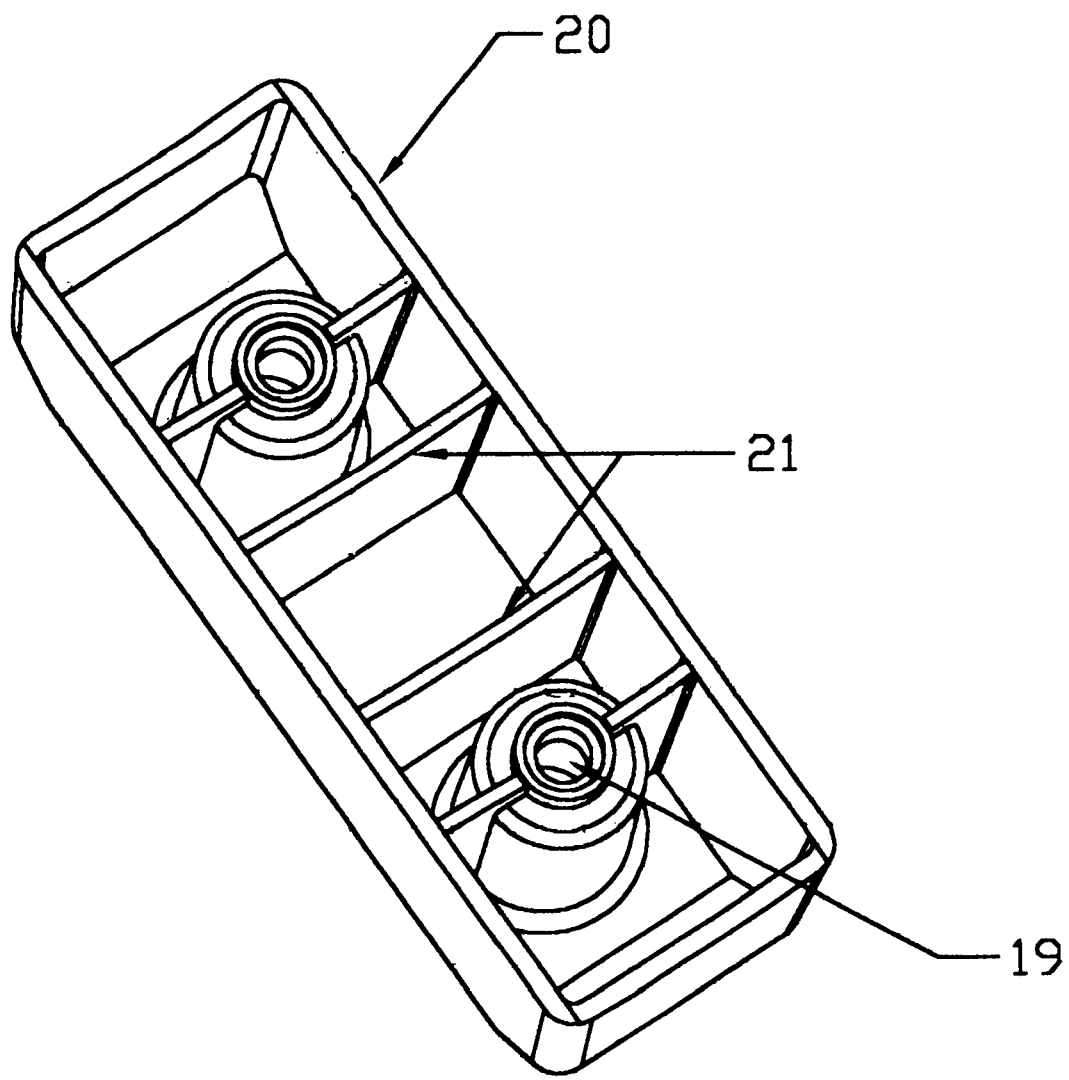
FIG. 3 is an underside perspective view of a typical riser utilized with the casing spacer of Applicants' present design.

FIG. 3 is a perspective bottom view of a typical riser (20). The riser (20) is hollow and configured with a plurality of stiffeners (21) to provide internal support. Each riser (12) has a plurality of openings or bores (19) for receiving the studs (14) used to secure the riser (20) to the band (12).

Figure 4:
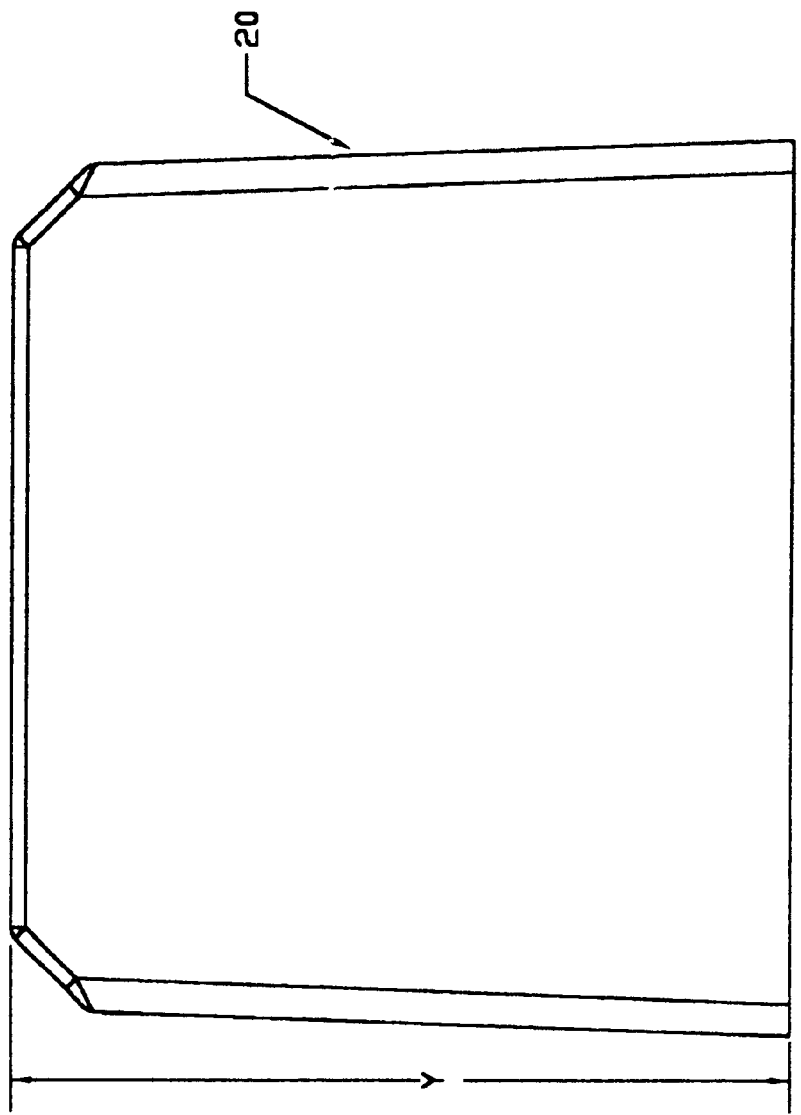
FIG. 4 is a side view of a typical riser utilized with the casing spacer of Applicant's present design illustrating the height variations of the riser.

FIG. 4 is a side view of a typical riser (20) to be utilized in conjunction with a band (12) to form the casing spacer (10). The height, vertical dimension (Y), of each riser (20) may be varied as desired. Providing an inventory of risers (20) having various vertical height dimensions (Y) will allow a user to construct, as desired, a casing spacer (10) of a desired configuration. Providing a plurality of risers (20) of varying height dimensions as may be desired or required will allow a user to easy adapt the casing spacer (10) in the field for use with variously sized carrier pipe. Similarly, bands (12) configured for a particularly sized carrier pipe can be readily fitted with a riser (20) of a desired size. Each riser (20) may be interchangeably used on variously sized bands (12) that are configured with the mount studs (14) as described herein. The user need only select a riser (20) with a desired height (Y) from an inventory stock comprised of a variety of risers (20), rather than from a stock comprised of a number of pre-configured casing spacers, and fit it to a band (12) of a desired configuration in order to have a casing spacer (10) of a desired size and riser configuration. The interchangeability of the risers (20) eliminates the need to maintain an inventory of completed casing spacers to fit multiple sizes of carrier pipe diameter with varying riser dimensions. Applicants' casing spacer (10) allows a user to change only a riser (20) rather than the entire casing spacer in order to have a casing spacer of a desired configuration.

The casing spacers (10) of Applicants' invention are particularly suitable for use in adjusting the grade of a pipeline having a gravity flow carrier pipe such as a sewer pipe. The fall or rise of the carrier pipe may be adjusted simply by fitting each of the bands (12) used on a carrier pipe with risers (20) of a selected vertical height (Y) to form a plurality of casing spacers (10) that may be placed in an array along a carrier pipe to adjust the carrier pipe to a desired slope or grade.

Figure 5:
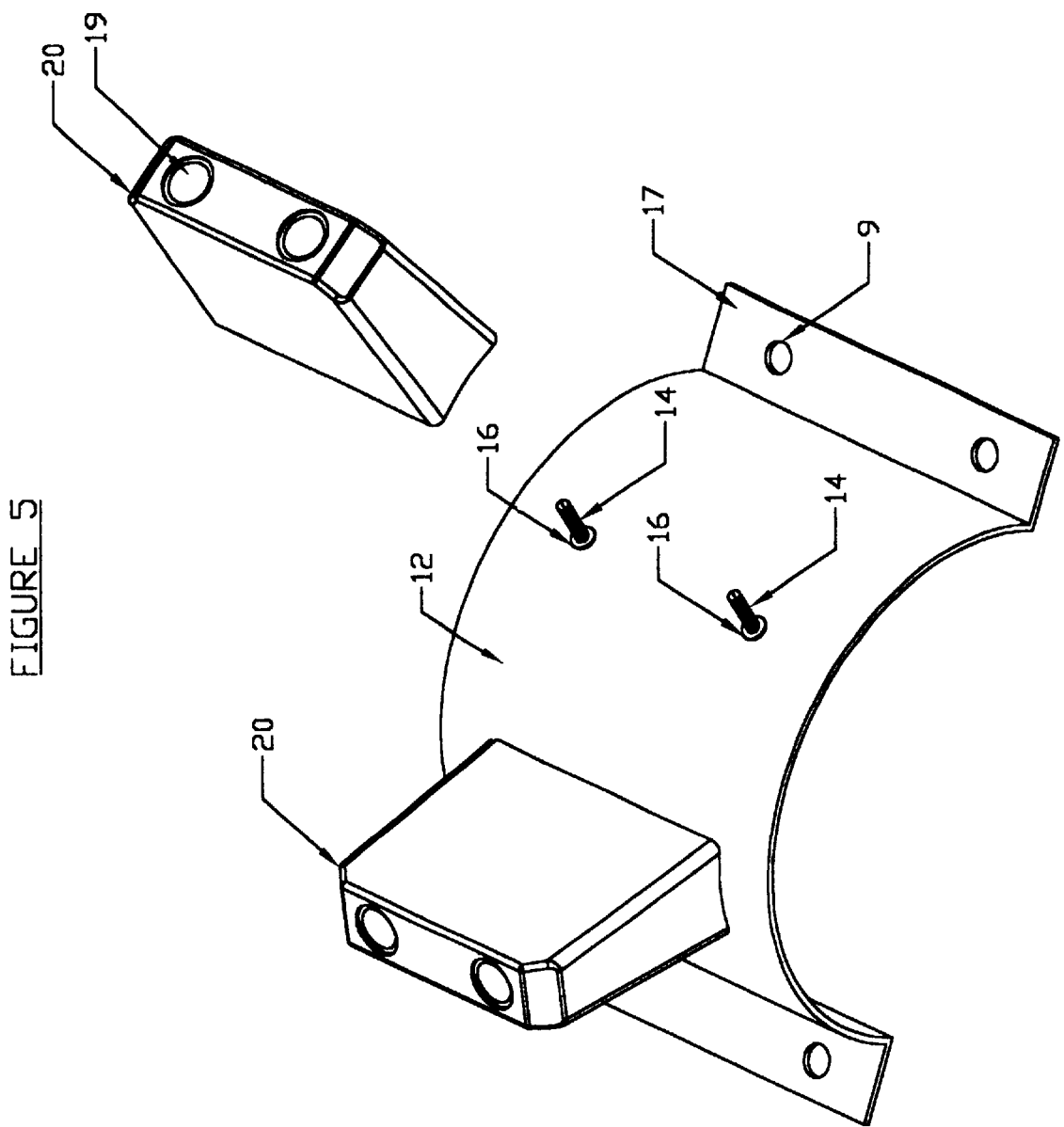
FIG. 5 is an exploded perspective view of a band and riser combination of the casing spacer shown in FIG. 1.

FIG. 5 is an exploded perspective view of a band (12) in combination with a pair of pre-selected risers (20) used to form a casing spacer (10) of Applicants' invention. Threaded mounting studs (14) are attached to the band (12) by welds (16) or other attaching means so that the studs (14) extend radially outward from the band (12). A riser (20) of a desired length may be removably mounted to the band (12) by inserting each stud (14) into the bore (19) formed in each riser (20). The riser (20) is held in place on the band (12) by means of the threaded stud (14) and the nut (22) as shown previously in FIG. 1. The belt (12) has flanges (17) and holes (9) to provide a means for attaching to of the bands (12) around a carrier pipe to form the completed casing spacer (10). Other attaching means may be utilized to hold the bands (12) around the carrier pipe without departing from the scope of Applicants' invention.

Each semi-circular band (12) is adapted to fit a carrier pipe of a nominal pipe diameter. The actual outside diameter of a carrier pipe may vary somewhat in the range of the nominally sized carrier pipe and still be fitted with a band (12) configured for that range of carrier pipe nominal diameters. The casing spacer (10) may be adjusted to account for variations in the outside diameter of individual carrier pipe by tightening or loosening the bolts (11) and nuts (13) that join the bands (12) together on the carrier pipe.

The embodiments of the casing spacer of Applicants' invention described herein are intended to be illustrative but not limiting and variations and changes may be made without departing from the spirit and scope of the invention as defined in the following claims.

We claim:

1. A casing spacer comprising:
   (a) first and second bands, each of said bands being formed in a semi-circular configuration of a desired radius, each of said bands having inside and outside radial surfaces;
   (b) a plurality of interchangeable risers, each of said interchangeable risers being configured to extend a desired distance from the outside radial surface of each of said bands;
   (c) means for removably attaching a desired riser selected from said plurality of interchangeable risers to each of said bands; and
   (d) means for fastening said first band and said second band together around a carrier pipe whereby said carrier pipe is supported on said desired risers when said carrier pipe is inserted into a casing pipe.

2. The casing spacer of claim 1, wherein said means for fastening said first band and said second band together around a carrier pipe includes providing each of said first and second bands with a pair of opposing flanges, each of said opposing flanges having a hole for receiving a threaded bolt and nut combination.

3. The flange protector of claim 2, wherein said means for removably attaching said desired risers to each of said bands includes:

(a) a plurality of threaded studs extending radially outward from each of said bands;

(b) providing each of said plurality of risers with a plurality of bores, each of said bores being adapted to receive one of said threaded studs; and (c) a plurality of nuts, said nuts being adapted to be received and tightened onto each of said studs in said bores of said desired risers and thereby removably fastening said desired risers to said bands.

4. The casing spacer of claim 3 further comprising a pad mounted onto the inside radial surface of each of said bands.

5. A method of providing casing spacers for a carrier pipe having a varying range of outside diameters for use within a casing pipe having a varying range of inside diameters comprising:

(a) providing a plurality of bands, each of said bands being formed in a semi-circular configuration to conform to the circumference of a selected range of carrier pipes;

(b) selecting at least one pair of bands from said plurality of bands, each of said bands in said selected pair of bands having substantially the same semi-circular configuration;

(c) providing means for mounting said selected pair of said bands on a carrier pipe selected from said selected range of carrier pipes;

(d) mounting said pair bands on said carrier pipe so as to encircled said carrier pipe with said pair of bands;

(e) providing a plurality of risers, each of said risers having a desired dimension;

(f) selecting a desired number of risers from said plurality of risers;

(g) detachably mounting said selected risers to said pair of bands whereby each of said risers extends outward radially from each of said bands in said pair of bands;

(h) inserting said carrier pipe with said detachably mounted pair of bands and said mounted risers into a selected casing pipe; and (i) supporting said carrier pipe within said selected casing pipe on said detachably mounted risers.

6. The method as recited in claim 5, wherein said step of providing a plurality of risers, each of said risers having a desired dimension, includes providing risers of varying heights.

7. The method as recited in claim 6, wherein said step of detachably mounting said selected risers to said pair of bands includes:

(a) providing a plurality of threaded studs extending radially outward from each of said bands in said pair of bands;

(b) providing each of said desired number of risers with a plurality of bores, each of said bores being adapted to receive one of said threaded studs; and (c) providing a plurality of nuts, each of said nuts being adapted to be tightened onto each of said studs received in said bores of said risers.

8. The method as recited in claim 7, wherein said step of mounting said pair bands on said carrier pipe so as to encircled said carrier pipe with said pair of bands includes:

(a) providing a each of said bands of said pair of bands with a pair opposing flanges, each of said opposing flanges having a hole for receiving a threaded bolt; and (b) providing a plurality of corresponding threaded bolts and nuts and inserting one of said threaded bolts into each of said flange holes for fastening said pair of bands together by means of said inserted bolt and said corresponding nut.

9. The method as recited in claim 8 further comprising the step of providing a resilient elastomeric pad mounted to each of said bands of said pair of bands so as position said pad between said carrier pipe and each of said bands of said pair of bands when said pair of bands is mounted to said carrier pipe.

10. A casing spacer comprising:

(a) first and second bands, each of said bands being formed in a semi-circular configuration of a desired radius;

(b) a plurality of threaded studs, said studs extending radially outward from the outside radial surface of said bands;

(c) a plurality of selected interchangeable risers, each of said interchangeable risers being configured to extend a desired distance from the outside radial surface of each of said bands, each of said risers having a plurality of bores, each of said bores being adapted to receive one of said threaded studs;

(d) a plurality of nuts, each of said nuts being adapted to be tightened onto one of said studs received in said bores of said selected risers and thereby removably fastening each said selected risers to said bands; and (e) means for fastening said first band and said second band together around a carrier pipe whereby said carrier pipe is supported on said selected risers when said carrier pipe is inserted into a casing pipe.

11. The casing spacer of claim 10, wherein said means for fastening said first band and said second band together around a carrier pipe includes providing said first and second bands with a pair of opposing flanges, each of said opposing flanges having a hole for receiving a threaded bolt and nut in combination.

12. The casing spacer as recited in claim 10 wherein each said riser is configured as a substantially hollow block having an open base, four substantially rectangular vertically extending sides, an outer support face transverse to said vertically extending sides and where said bore is a tube positioned and supported within said hollow block.

13. The casing spacer of claim 12 further comprising a resilient pad mounted onto the inside radial surface of each of said bands.

14. The casing spacer of claim 12 wherein, said tubular mounting piece is configured to receive the drive socket of a socket wrench.

15. The casing spacer of claim 14 wherein said riser is made from plastic.

16. A casing spacer comprising:

(a) first and second bands, each of said bands being formed in a semi-circular configuration of a desired radius;

(b) a plurality of threaded studs attached to said bands, said studs extending radially outward from the outside radial surface of said bands;

(c) a plurality of interchangeable risers, each riser configured to extend a desired selected distance from the outside radial surface of each of said bands, each riser configured as a substantially hollow block having an open base, four substantially rectangular vertically extending sides, an outer support face transverse to said vertically extending sides and at least one tube positioned and supported within said hollow block, said tube adapted to receive one of said threaded studs;

(d) a plurality of nuts, said nuts adapted to be tightened onto said studs received in said tube of a desired riser selected from said plurality of risers and thereby removably fastening each said selected riser to said bands; and (e) means for fastening said first band and said second band together around a carrier pipe whereby said carrier pipe is supported on said selected risers when said carrier pipe is inserted into a casing pipe.

* * * * *